Nov. 10, 1953  L. W. JONES  2,658,478
DOG MUZZLE

Filed March 21, 1950  3 Sheets-Sheet 1

Laurence W. Jones
INVENTOR.

BY *Clarence A. O'Brien*
*and Harvey B. Jacobson*
Attorneys

Nov. 10, 1953  L. W. JONES  2,658,478
DOG MUZZLE
Filed March 21, 1950  3 Sheets-Sheet 2
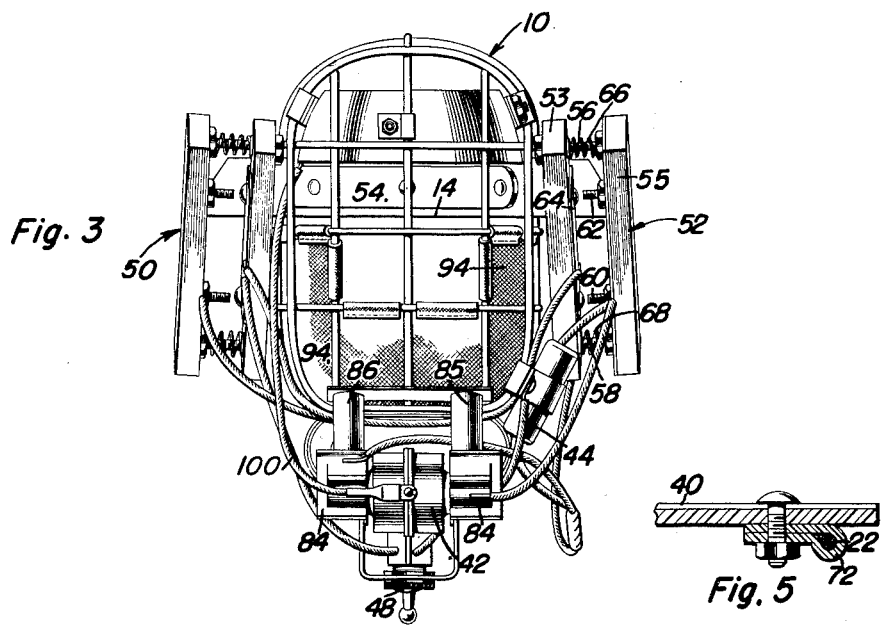
Fig. 3
Fig. 5
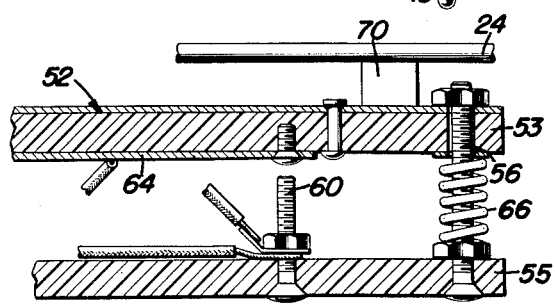
Fig. 4
Fig. 6
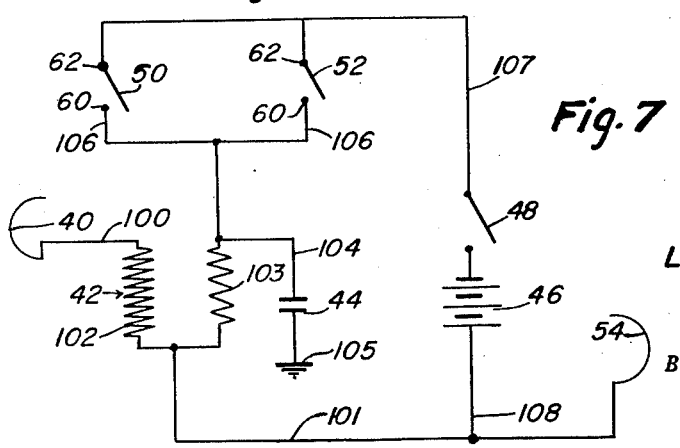
Fig. 7
Laurence W. Jones
INVENTOR.

Nov. 10, 1953   L. W. JONES   2,658,478
DOG MUZZLE

Filed March 21, 1950   3 Sheets-Sheet 3

Laurence W. Jones
INVENTOR.

Patented Nov. 10, 1953

2,658,478

UNITED STATES PATENT OFFICE 2,658,478

DOG MUZZLE

Laurence W. Jones, Longwood, Fla.

Application March 21, 1950, Serial No. 151,010

3 Claims. (Cl. 119—130)

This invention relates to improvements in attachments for dogs.

An object of this invention is to render it easier to train dogs and to race dogs by a mechanism which shocks a dog slightly when the dog engages an object with his head, such as another dog.

In racing it is not uncommon for two dogs to stop racing and turn upon each other for the purpose of fighting. Accordingly, it is another object of this invention to minimize this occurrence by shocking the dogs when they stop and contact each other with their heads.

Another object of this invention is to provide an improved muzzle either with or without the electrical system for causing shocks to the dog at two spaced places, preferably the dog's nose and the region of the dog's body behind his head.

Ancillary objects and features will become apparent to those skilled in the art, in following the description of the illustrative form of the invention.

In the drawings:

Figure 3 is a view taken substantially on the line 3—3 in Figure 1 and in the direction of the arrows;

Figure 4 is a sectional view in enlarged scale and taken on the line 4—4 of Figure 1 and in the direction of the arrows;

Figure 5 is a sectional view in an enlarged detail taken on the line 5—5 of Figure 1 and in the direction of the arrows;

Figure 6 is an enlarged sectional view of one strap showing the contact connected therewith and taken on the line 6—6 of Figure 2 and in the direction of the arrows;

Figure 7 is a wiring diagram illustrating the electrical attachments on the muzzle;

Figure 8:
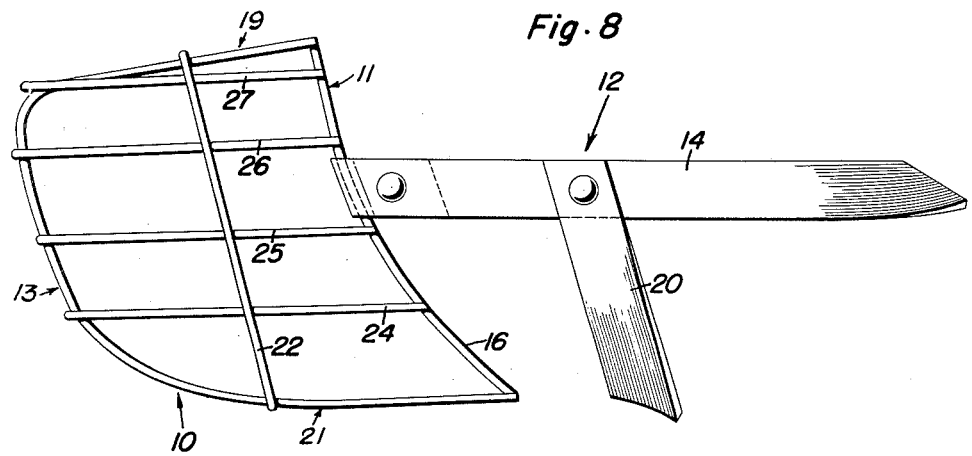
Figure 8 is a view in side elevation of the device of Figure 1 with the drip tray and the electrical attachments removed.
Figure 9:
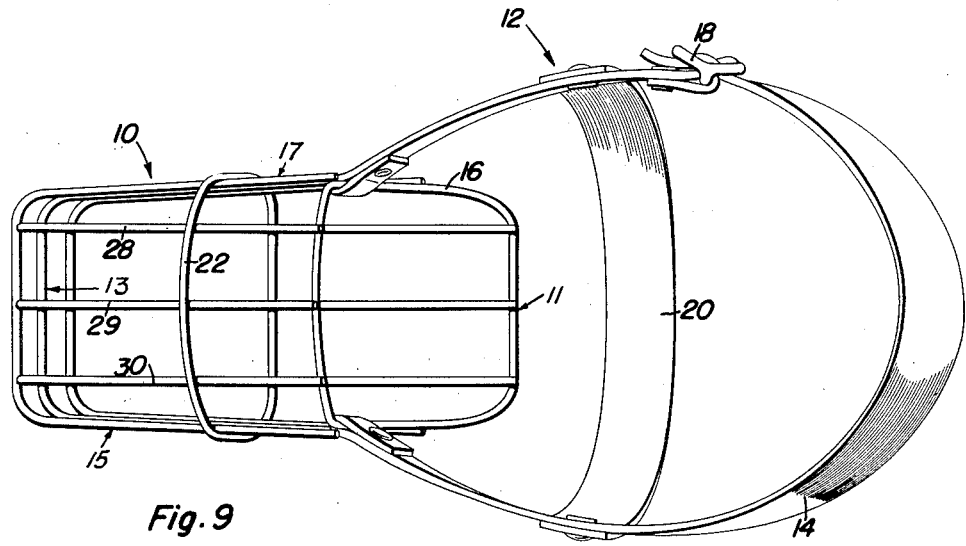
Figure 9 is a top view of the device in Figure 8.

Reference is first made to Figures 8 and 9 wherein the nose cover 10 of my dog muzzle is illustrated with a harness 12 connected therewith. The harness consists of a first strap 14 which is secured at one end to an oblong wire frame member 16 of the nose cover 10 and secured at the other end to the same frame member. A buckle 18 is interposed intermediate the ends of this strap 14 for releasably connecting it to a dog to extend behind the upper portion of the dog's head over its neck. A second strap 20 is secured at its ends to the strap 14 and is adapted to engage the dog in the region of the lower neck or throat.

The nose cover 10 is made of wire with the oblong frame member 16 forming the rear portion 11 of said cover and which is swept back. (Figure 8) rearwardly and downwardly. A frame member 22 is secured intermediate the front and rear portions 11, 13 of the nose cover 10 to U-shaped vertically spaced wire pieces 24, 25, 26 and 27 extending along the sides 15, 17 of the cover 10 and across the front portion 11 of said cover. U-shaped wire pieces 28, 29, and 30 to which the frame member 22 is also connected, are fixed to the side pieces 24, 25, 26, 27 at the front portion 13 and to the rear frame member 16 and form the top 19 and bottom 21 of the cover 10.

Referring now to Figure 7, which illustrates schematically the electrical appurtenances which are connected with the described muzzle and harness and the electrical circuit therefor, a nose piece contact 40 and a neck contact 54 on the strap 14 are connected by conductors 100, 101 to the high tension side 102 of a well known conventional spark coil 42, the contacts being designed to ground the circuit on the high tension side of the circuit through the dog's body. A condenser 44 is connected by a conductor 104 to the low tension side 103 of the spark coil 42 and grounded as at 105. A pair of like elongated switches 50, 52, respectively, are connected in parallel on one side in the low tension side 103 of the spark coil 42 by conductors 106 leading to switch contacts 60, and a conductor 107 from one side of the battery 46 leading to switch contacts 62 on the other sides of the switches. The battery 46 is connected by a ground conductor 108 to conductor 101 and the conductor 107 has a circuit breaker 48 interposed therein.

As will be seen the nose piece contact 40 and the neck contact 54 are so arranged that when either or both switches 50, 52 are closed, the dog is shocked through said contacts 40, 54 provided the circuit breaker 48 is closed. The switches 50, 52 are provided at each side 15, 17 of the nose cover 10 to extend substantially horizontally along the adjacent side 15, 17, as the case may be, and, as will be seen, are pressure switches that coact with the coil 42 in inducing a high voltage electric current.

For the specific structure in attachment, reference is made to Figures 4–6. In Figure 4, the switch 52 is illustrated. This switch consists of two strips 53 and 55 of insulating material which are separated from each other by a pair of bolts 56 and 58. The strip 55 has contacts 60 and 62 in the form of screws secured thereto with the necessary wiring extending therefrom. The contact plate 64 is screwed or otherwise rigidly fixed to the insulating strip 53 and in the path of movement of the contact screws 62 and 60.

Springs 66 and 68 space the strips 53 and 55 from each other, constantly opposing that operation which will cause engagement of the contact screws 60 and 62 with the contact strip 64.

The strip 53 and accordingly, the strip 55, is secured to two or more of the wire pieces 24, 26, at the adjacent side 15, 17 of the cover 10 by means of brackets or hangers 70.

The nose contact 40 is U-shaped to straddle the dog's nose and is made of suitable electrically conductive strip material and secured by means of the clamps 72 to the wire member 22 inside the front portion of the nose cover 10 in rearwardly extending position to engage the front and sides of the dog's nose. The location of the contact 40 is of importance inasmuch as it is adapted to contact the nose of the dog when he urges his head forward in the muzzle.

Any movement of the dog's head sufficient to actuate the pressure switches 50, 52 will obviously result in pressing of the dog's nose against the nose piece contact 40 and thus a complete electric circuit will be established between this contact and the contact 54.

Reference to Figure 6 shows the contact 54 as being disposed on one surface of the first strap 14 and riveted as at 76 thereto. The contact 54 is of rather flexible strip material and is adapted to engage the dog as illustrated in Figure 1.

Figure 1:
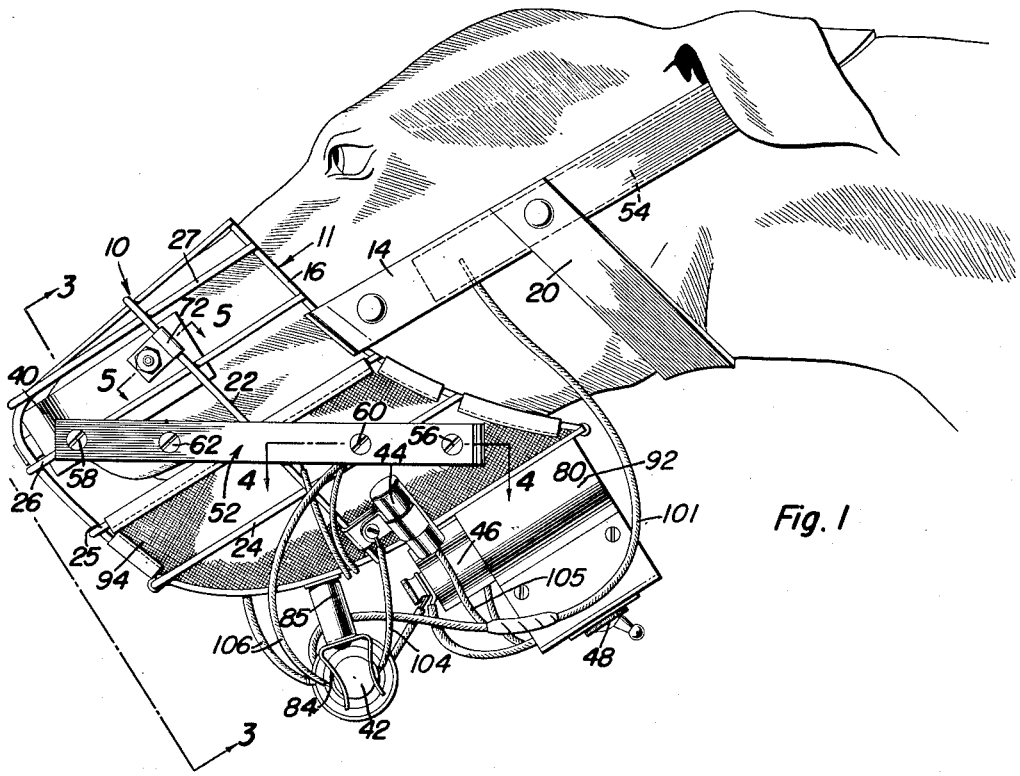
Figure 1 is a side view of one form of the invention.
Figure 2:
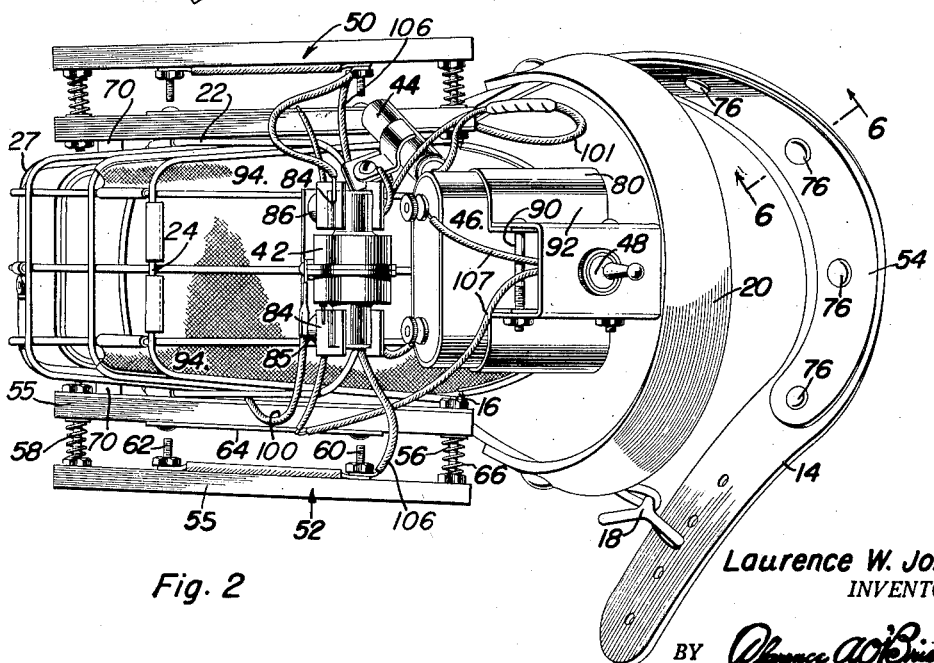
Figure 2 is a bottom view of the device shown in Figure 1.

Referring now to Figure 1, the battery 46 is illustrated as being held in place by means of the battery clamp 80 which is hung from the bottom 21 of the nose cover 10 of the muzzle. Suitable fastening devices are used for holding this element in place and the switch 48 is of the conventional toggle type.

The condenser 44 is grounded to one of the wire elements of the nose cover and is electrically connected with a hot wire. It is also connected with the spark coil 42 which is held in place by means of the clips 84, which are suspended from posts 85 and 86 on the bottom 21 of nose cover 10. These posts are fixed by means of conventional fastening devices or expedients to the nose cover 10.

The suitable and necessary wiring is secured as found convenient and is required.

In order to hold the battery 46 in place so that it will not shake loose, the battery clamp 80 is of the yielding type, being held fixed to the battery by means of the stay bolts 90, these same stay bolts holding the switch plate 92 so that the switch is located conveniently below the nose cover 10.

A tray 94 of flexible material, as a heavy cloth, is secured to the bottom 21 of the nose cover to serve as a trap. This tray is of an optional character, it being used with or without the muzzle as shown in Figure 8 and with or without the muzzle as shown in Figure 1.

Having thus described the invention, what is claimed as new is:

1. A muzzle comprising a wire nose cover having a top, bottom, and sides, a first harness strap secured to said nose cover and adapted to extend behind the upper part of a dog's head, and a second harness strap secured to said first strap and adapted to extend around the lower part of the dog's neck, a battery carried by said nose cover, elongated pressure switches disposed substantially horizontally one on each side of said nose cover, a coil wired to said battery and said switches, and contacts carried by the cover and the first named harness strap to engage the dog and connected in circuit with said battery, coil and switches to shock the dog when either of said switches is closed, said switches coacting with said coil in inducing a high voltage electrical current.

2. A dog muzzle comprising a wire nose cover having a top, bottom and sides, and a front portion, a harness strap attached to the sides of the cover and adapted to extend over the neck of the dog, a contact fixed in the front portion of said cover to dispose the same in front of the nose of the dog, a flexible contact extending along said strap and adapted to extend over the neck of the dog, and means carried by said cover for electrically energizing said contacts comprising a battery suspended from the bottom of the cover, and a pair of elongated switches one on each side of said cover connected in circuit with said battery and contacts and each comprising a horizontally movable switch closing pressure responsive strip member extending substantially horizontally along the adjacent side of the cover.

3. A dog muzzle comprising a mesh wire nose cover having a top, bottom and sides, and a front portion, a harness strap attached to the rear portion of the cover and adapted to extend over the neck of the dog, contacts carried by said cover and strap to engage the dog including a U-shaped contact fixed in the front portion of the cover in rearwardly extending position whereby said contact is adapted to straddle the nose of the dog and engage the front and sides thereof, and means carried by said cover for electrically energizing said contacts comprising a battery suspended from the bottom of the cover, and a pair of elongated switches one on each side of said cover extending substantially horizontally along the adjacent side of the cover connected in circuit with said battery and contacts and pressure-responsive to close the same.

LAURENCE W. JONES.

References Cited in the file of this patent

UNITED STATES PATENTS

| Number | Name | Date |
|---|---|---|
| 522,696 | Sanborn | July 10, 1894 |
| 872,279 | Dusenbury | Nov. 26, 1907 |
| 1,179,149 | Weikert | Apr. 11, 1916 |
| 2,177,789 | Sacker | Oct. 31, 1939 |
| 2,263,503 | Kennedy | Nov. 18, 1941 |
| 2,510,337 | Franklin | June 6, 1950 |
| 2,602,421 | Barker | July 8, 1952 |